June 22, 1926.
F. D. VAN BUREN
1,590,137
SHOCK ABSORBER
Filed Jan. 28, 1926
2 Sheets-Sheet 1
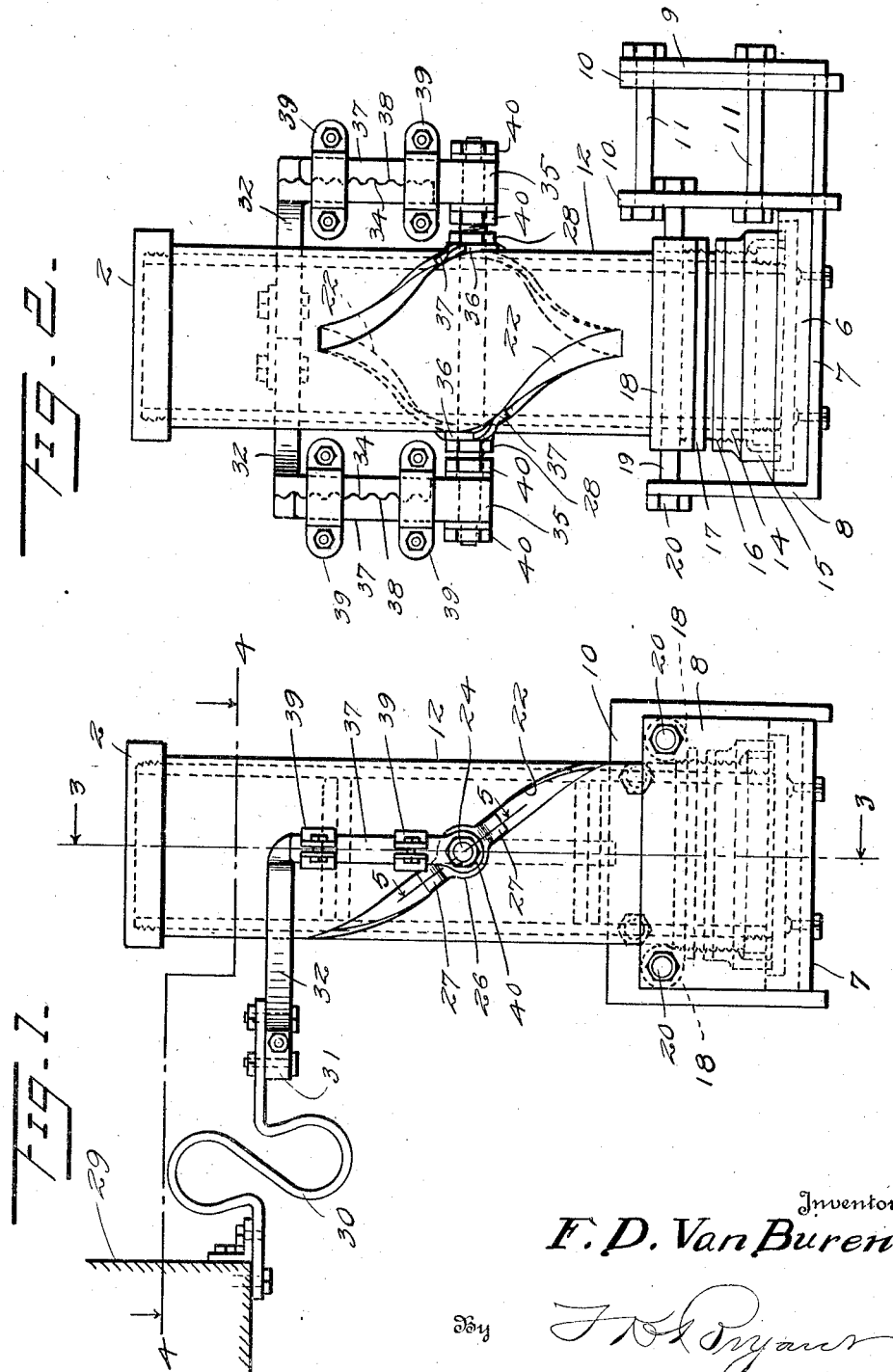
Inventor
F. D. Van Buren.
Attorney.

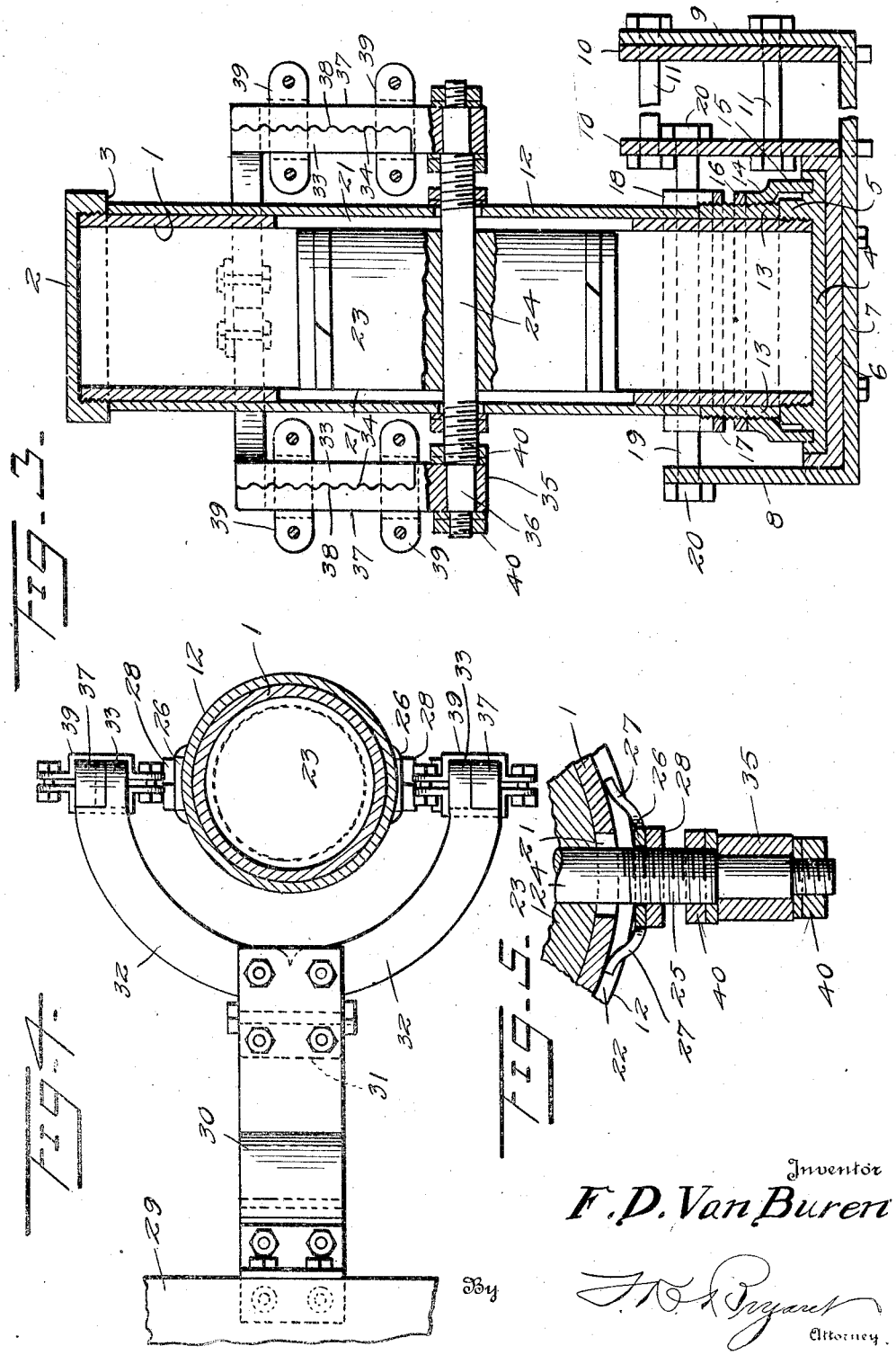

Patented June 22, 1926.

1,590,137

UNITED STATES PATENT OFFICE.

FREDERICK D. VAN BUREN, OF ITHACA, NEW YORK.

SHOCK ABSORBER.

Application filed January 28, 1926. Serial No. 84,349.

This invention relates to certain new and useful improvements in shock absorbers of the pneumatic type wherein a piston reciprocating in a cylinder is cushioned during reciprocating movement toward each end of the cylinder, the shock absorber being interposed between the vehicle frame and axle.

A further object of the invention is to provide a pneumatic shock absorber associated with a metallic spring, the shock absorber and spring being interposed between the vehicle frame and axle.

A still further object of the invention is to provide a pneumatic shock absorber to be positioned between a vehicle frame and axle and including an adjustable bracket mounting to accommodate the shock absorber to vehicles of different types, more particularly where the distance varies between the vehicle frame and axle.

With the above and other objects in view that will become apparent as the nature of the invention is better understood, the same consists of the novel form, combination and arrangement of parts, hereinafter more fully described, shown in the accompanying drawings and claimed.

In the drawings, wherein like reference characters designate corresponding parts throughout the several views, Figure 1 is a side elevational view of a pneumatic shock absorber constructed in accordance with the present invention showing the metallic spring associated with the shock absorber and both elements positioned between a vehicle frame and axle, Figure 2 is a front elevational view of the shock absorber showing the adjustable bracket support for the shock absorber cylinder, Figure 3 is a vertical cross-sectional view taken on line 3—3 of Fig. 1, Figure 4 is a horizontal sectional view taken on line 4—4 of Fig. 1, and Figure 5 is a detail sectional view taken on line 5—5 of Fig. 1.

The cylinder construction and axle mounting of the shock absorber is shown more clearly in Figs. 2 and 3 and includes a cylinder 1 externally threaded at its upper and lower ends, the upper end of the cylinder being closed by a screw cap 2 carrying a relatively wide side skirt forming an annular shoulder 3. A disk plate 4 closes the bottom of the cylinder 1 and carries an upstanding internally threaded annular wall 5 into which the lower end of the cylinder 1 is threaded. A base plate 6 supports the disk plate 4 and a channel frame including a bottom wall 7 and upstanding end walls 8 and 9 supports the base plate. The end wall 9 is spaced from the base plate 6 as shown in Figs. 2 and 3 and a pair of clamping plates 10 supported on the bottom wall 7 of the channel bracket is adapted for clamping engagement with an axle under influence of the bolts 11.

A cylindrical sleeve 12 encloses the cylinder 1, being rotatable thereon and in frictional contact therewith for purposes presently to appear, the upper end of the sleeve 12 engaging the shoulder 3 on the closure cap 2 while the lower end of the sleeve is engaged by the upper edge of the externally threaded collar 13 that rests upon the upper edge of the annular wall 5, the collar 13 being retained in position by the screw ring 14 externally threaded upon the collar with the lower flanged end 15 thereof seated in an annular groove in the upper face of the disk plate 4 outwardly of the annular wall 5, the screw ring being retained in position by the locking ring 16 threaded on the collar 13 above the same as shown in Fig. 3. The channel-shaped supporting bracket is further anchored to the cylinder by the ring 17 threaded onto the collar 13, the ring carrying diametrically opposite parallel tubular barrels 18 through which tie bolts 19 extend that are secured at their ends as at 20 to the end wall 8 of the channel bracket and adjacent clamping plate.

Diametrically opposite longitudinally extending slots 21 are formed in the cylinder 1 while diametrically opposite spiral slots 22 are formed in the sleeve 12, said slots being positioned intermediate the opposite ends of the cylinder and sleeve. A solid piston 23 is reciprocable in the cylinder 1 and the supporting cross shaft 24 therefor extends thru the slots 21 and 22 as shown in Fig. 3. The opposite ends of the shaft 24 extending freely thru said openings are threaded as at 25 and upon which threaded portion a ring 26 having spring fingers 27 that extend into the spiral slot for engaging the outer side of the cylinder 1 is mounted, the bearing pressure of the spring fingers on said cylinder being regulated by the nut 28 threaded on said shaft. The ring 26 engaging the outer side of the sleeve 12 forms a closure for that portion of the spiral slot 22 traversing the slot 21 in the cylinder 1. The sleeve 12 with its spiral slot effectively closes the longitudinal slot 21 in the cylinder 1 for the exclusion of dirt and other foreign matter from the cylinder while the crossing point of the two slots where the shaft 24 extends therethrough is effectively closed by the ring 26, the fingers 27 carried by said ring remaining in the spiral slots 22 during rotation of the sleeve 12.

A bracket and metallic spring is interposed between the shaft 24 and vehicle frame and as shown in Fig. 1, the vehicle frame 29 has one end of an S-shaped metallic spring 30 secured thereto while the other end of said spring is attached to a block 31 that carries forked arcuate arms 32 forming a semi-circle in combined formation as shown in Fig. 4. The free end of each arm 32 carries a depending leg 33 with the outer side thereof corrugated as at 34. A block 35 supported upon the plain reduced portion 36 of the projecting end of the shaft 24 carries an upstanding leg 37 having the inner face thereof corrugated as at 38 for interlocking engagement with the corrugated face of the leg 33. The engaged legs 33 and 37 are retained in assembled adjusted positions by the strap clamps 39. As shown in Figs. 3 and 5, the block 35 is retained upon the plain portion 36 of said shaft by the jamb nuts 40. With the provision of the adjustable legs 33 and 37, the shock absorber adapts itself to vehicles of various types, more particularly where there is a variance in distance between the vehicle frame and axle, it being necessary only to lengthen or shorten the adjustably connected legs and again secure them by the straps 39. The piston 23 will be cushioned in its movements toward each end of the cylinder 1 and unusual shock and jars will be absorbed by the springs 30. When the shaft 24 moves through the slotted portions 21 of the cylinder with the piston 23 the sleeve 12 will rotate on said cylinder and the changing crossed points of the slots 21 and 22 will be closed by the ring 26 thereby excluding all dirt and foreign matter from the cylinder and insuring a perfect and easy working of the piston 23.

This shock absorber may be mounted horizontal instead of vertical, as illustrated, and the mounting or connecting means positioned accordingly. Should it be found desirable, the slots 21 and 22 may be omitted at one side of the device and the shaft 24 shortened and secured to the piston 23 for extending through the slotted side of the cylinder 1 and sleeve 12.

While I have herein shown and described one manner in which my invention can be carried into effect, it will be understood that changes or modifications therein may be required or desired to meet the exigencies of use, and I desire it to be understood that I reserve the right to make any and all such changes and modifications as may be found necessary or desirable in so far as the same may fall within the scope of the invention as expressed in the accompanying claims.

What is claimed is:—

1. In a shock absorber, a cylinder, a sleeve rotatable thereon, said cylinder having longitudinal diametrically opposite slots and said sleeve having diametrically opposite spiral slots with said slots crossing each other, a piston in the cylinder, a cross shaft supporting the piston and extending through said slots, a bracket connection between one end of the cylinder and a vehicle axle and a bracket connection between the opposite ends of the shaft and vehicle frame.

2. In a shock absorber, a cylinder, a sleeve rotatable thereon, said cylinder having longitudinal diametrically opposite slots and said sleeve having diametrically opposite spiral slots with said slots crossing each other, a piston in the cylinder, a cross shaft supporting the piston and extending through said slots, a bracket connection between one end of the cylinder and a vehicle axle and a bracket connection between the opposite ends of the shaft and vehicle frame including a metallic spring.

3. In a shock absorber, a cylinder, a sleeve rotatable thereon, said cylinder having longitudinal diametrically opposite slots and said sleeve having diametrically opposite spiral slots with said slots crossing each other, a piston in the cylinder, a cross shaft supporting the piston and extending through said slots, a bracket connection between one end of the cylinder, a vehicle axle and a bracket connection between the opposite ends of the shaft and vehicle frame, and a ring on each end of the shaft for closing the openings at the crossing points of the slots.

4. In a shock absorber, a cylinder, a sleeve rotatable thereon, said cylinder having longitudinal diametrically opposite slots and said sleeve having diametrically opposite spiral slots with said slots crossing each other, a piston in the cylinder, a cross shaft supporting the piston and extending through said slots, a bracket connection between one end of the cylinder, a vehicle axle and a bracket connection between the opposite ends of the shaft and vehicle frame including a metallic spring, and a ring on each end of the shaft for closing the openings at the crossing points of the slots.

5. In a shock absorber, a cylinder, a sleeve rotatable thereon, said cylinder having longitudinal diametrically opposite slots and said sleeve having diametrically opposite spiral slots with said slots crossing each other, a piston in the cylinder, a cross shaft supporting the piston and extending through said slots, a bracket connection between one end of the cylinder, a vehicle axle and a bracket connection between the opposite ends of the shaft and vehicle frame, said last named bracket connection including longitudinally adjustable legs having interengaging faces and clamping straps enclosing the legs to hold them in adjusted positions.

6. In a shock absorber, a cylinder, a sleeve rotatable thereon, said cylinder having longitudinal diametrically opposite slots and said sleeve having diametrically opposite spiral slots with said slots crossing each other, a piston in the cylinder, a cross shaft supporting the piston and extending through said slots, a bracket connection between one end of the cylinder, a vehicle axle and a bracket connection between the opposite ends of the shaft and vehicle frame including a metallic spring, said last named bracket connection including longitudinally adjustable legs having interengaging faces, and clamping straps enclosing the legs to hold them in adjusted positions.

7. In a shock absorber, a cylinder, a sleeve rotatable thereon, said cylinder having longitudinal diametrically opposite slots and said sleeve having diametrically opposite spiral slots with said slots crossing each other, a piston in the cylinder, a cross shaft supporting the piston and extending through said slots, a bracket connection between one end of the cylinder, a vehicle axle and a bracket connection between the opposite ends of the shaft and vehicle frame, a ring on each end of the shaft for closing the openings at the crossing points of the slots, said last named bracket connection including longitudinally adjustable legs having interengaging faces, and clamping straps enclosing the legs to hold them in adjusted positions.

8. In a shock absorber, a cylinder, a sleeve rotatable thereon, said cylinder having longitudinal diametrically opposite slots and said sleeve having diametrically opposite spiral slots with said slots crossing each other, a piston in the cylinder, a cross shaft supporting the piston and extending through said slots, a bracket connection between one end of the cylinder, a vehicle axle and a bracket connection between the opposite ends of the shaft and vehicle frame including a metallic spring, a ring on each end of the shaft for closing the openings at the crossing points of the slots, said last named bracket connection including longitudinally adjustable legs having interengaging faces and clamping straps enclosing the legs to hold them in adjusted positions.

9. In a shock absorber, a cylinder, a sleeve rotatable thereon, said cylinder having longitudinal diametrically opposite slots and said sleeve having diametrically opposite spiral slots with said slots crossing each other, a piston in the cylinder, a cross shaft supporting the piston and extending through said slots, a bracket connection between one end of the cylinder, a vehicle axle and a bracket connection between the opposite ends of the shaft and vehicle frame including a metallic spring, said last named bracket connection including longitudinally adjusting legs having interengaging faces, clamping straps enclosing the legs to hold them in adjusted positions, the bracket connection between the cylinder and axle including a clamp secured to the cylinder and clamping plates for engaging an axle.

10. In a shock absorber, a cylinder, a sleeve rotatable thereon, said cylinder having longitudinal diametrically opposite slots and said sleeve having diametrically opposite spiral slots with said slots crossing each other, a piston in the cylinder, a cross shaft supporting the piston and extending through said slots, a bracket connection between one end of the cylinder, a vehicle axle and a bracket connection between the opposite ends of the shaft and vehicle frame, a ring on each end of the shaft for closing the openings at the crossing points of the slots, said last named bracket connection including longitudinally adjustable legs having interengaging faces, clamping straps enclosing the legs to hold them in adjusted positions, the bracket connection between the cylinder and axle including a clamp secured to the cylinder and clamping plates for engaging an axle.

11. In a shock absorber, a cylinder, a sleeve rotatable thereon, said cylinder having longitudinal diametrically opposite slots and said sleeve having diametrically opposite spiral slots with said slots crossing each other, a piston in the cylinder, a cross shaft supporting the piston and extending through said slots, a bracket connection between one end of the cylinder, a vehicle axle and a bracket connection between the opposite ends of the shaft and vehicle frame including a metallic spring, a ring on each end of the shaft for closing the openings at the crossing points of the slots, said last named bracket connection including longitudinally adjustable legs having interengaging faces, clamping straps enclosing the legs to hold them in adjusted positions, the bracket connection between the cylinder and axle including a clamp secured to the cylinder and clamping plates for engaging an axle.

12. In a shock absorber, a cylinder, a piston therein, a spring suspension between the piston and vehicle frame, a fixed connection between the cylinder and vehicle axle, a sleeve rotatable on the cylinder, said cynder and sleeve having crossed slots therein, and means associated with the piston at the point of the crossed slots to exclude foreign substances from the cylinder.

13. In a shock absorber, a cylinder, a piston therein, a cross shaft supporting the piston, a rotatable sleeve enclosing the cylinder, said cylinder and sleeve having crossed slots thru which the shaft extends, a spring suspension between the shaft and vehicle frame and a fixed connection between the cylinder and vehicle axle.

14. In a shock absorber, a cylinder, a piston therein, a cross shaft supporting the piston, a rotatable sleeve enclosing the cylinder, said cylinder and sleeve having crossed slots thru which the shaft extends, a spring suspension between the shaft and vehicle frame, a fixed connection between the cylinder and vehicle axle, and means associated with opposite ends of the shaft for closing the crossed points of the slots to exclude foreign substances from the cylinder.

In testimony whereof I affix my signature.

FREDERICK D. VAN BUREN.